United States Patent [19]

Hunter et al.

[11] Patent Number: 5,009,473

[45] Date of Patent: Apr. 23, 1991

[54] LOW VIBRATION RESONANT SCANNING UNIT FOR MINIATURE OPTICAL DISPLAY APPARATUS

[75] Inventors: Gregory H. Hunter, Westwood; Benjamin A. Wells, Newton; Michael A. Feldstein, Sudbury, all of Mass.

[73] Assignee: Reflection Technology, Inc., Waltham, Mass.

[21] Appl. No.: 434,351

[22] Filed: Nov. 13, 1989

Related U.S. Application Data

[63] Continuation-in-part of Ser. No. 200,645, May 31, 1988, Pat. No. 4,902,083.

[51] Int. Cl.$^5$ ............................................. G02B 26/10
[52] U.S. Cl. ...................................... 350/6.6; 350/486
[58] Field of Search .................... 350/6.6, 6.91, 486, 350/487; 250/234, 235; 358/208; 310/38, 39; 340/755, 752; 156/425, 175

[56] References Cited

U.S. PATENT DOCUMENTS 4,708,420 11/1987 Liddiard .............................. 350/6.6
4,802,720 2/1989 Paulsen ............................... 350/6.6
4,902,083 2/1990 Wells .................................. 350/6.6

FOREIGN PATENT DOCUMENTS 3833260 6/1989 Fed. Rep. of Germany ...... 350/486

Primary Examiner—Bruce Y. Arnold
Assistant Examiner—Loha Ben
Attorney, Agent, or Firm—Wolf, Greenfield & Sacks

[57] ABSTRACT

A resonant scanning unit utilizes a "tuning fork" design with a mirror mounted on one arm of the tuning fork and a counterbalance mass mounted on the other arm. A voice coil electromagnetic motor mounted between the arms causes the arms to move in opposite directions. Light generated by a line of LEDs is reflected from the oscillating mirror to generate a raster display. Reaction forces generated by the motions of the mirror and counterbalance mass cancel at the device base, reducing vibration. In addition, the inventive structure allows placement of the mirror pivot point away from the center of the mirror which allows display devices constructed with the structure to be reduced in size. A second embodiment is disclosed in which molded construction reduces assembly cost and time and allows precise tuning of the reaction forces.

24 Claims, 9 Drawing Sheets

LOW VIBRATION RESONANT SCANNING UNIT FOR MINIATURE OPTICAL DISPLAY APPARATUS

RELATED APPLICATIONS

This application is a continuation-in-part of U.S. patent application Ser. No. 07/200,645 for LOW VIBRATION RESONANT SCANNING UNIT FOR MINIATURE OPTICAL DISPLAY APPARATUS, filed on May 31, 1988 by Benjamin A. Wells and assigned to the same assignee as the present invention, now U.S. Pat. No. 4,902,083.

FIELD OF THE INVENTION

This invention relates to display devices which generate a raster scan image by using a line of light-emitting device displayed by means of an oscillating mirror. More particularly, the invention relates to means for reducing vibration in such devices caused by the rapid oscillation of the mirror.

BACKGROUND OF THE INVENTION

There are many different types of display devices which can visually display information such as figures, numbers and video information. These devices include the ubiquitous cathode ray tube in which a raster is created by repetitively sweeping an electron beam in a rectangular pattern. The image is created by selectively modulating the beam to generate light and dark spots on the raster.

Another display device is an electromechanical scanning system in which a line of light-emitting devices is modulated with the information to be displayed. The illuminated line is converted into a raster by means of an oscillating mirror thereby generating a virtual raster image. These latter devices have the advantage that a full "page" display can be created from a much smaller number of light-emitting devices than is necessary to generate a normal full page real image.

In operation, an enlarged, virtual image of the illuminated devices is reflected from a mirror as the mirror is being physically pivoted about a fixed axis by means of an electromagnetic motor. Although it is possible to directly drive the mirror to produce oscillations, in order to reduce the power necessary to drive the mirror, it is possible to use a resonant electromechanical oscillator to move the mirror. In such an oscillator, the mirror is mounted on a spring attached to a frame so that the mass of the mirror and the spring create a mechanical resonator. An electromagnetic motor oscillates the mirror mass at the resonant frequency of the spring/mirror system. In this manner, only a small amount of power is needed to produce a relatively large oscillation. Such a conventional resonant oscillator is shown in U.S. Pat. No. 4,632,501 in which the mirror is attached to the base by a thin sheet of spring material.

A problem with the conventional mirror/spring oscillator system is that the rapid angular oscillation of the mirror requires a large spring force to accelerate and decelerate the mirror. The spring force is also applied to the base of the device and constitutes a "reaction force". When the base is rigidly secured to a relatively massive object, this force is not a serious concern. However, when it is impossible or undesirable to attach the display device to a massive object, as is the case for hand-held, eyeglass-mounted or "heads-up" displays, the force causes vibrations which are, at best, annoying and, in some cases, may cause the resulting image to be blurred or even unintelligible. In addition, the vibration can disrupt the function of an accompanying instrument, such as a microscope, that is sensitive to vibration. Further, even if the vibration is acceptable, the power required to oscillate the mirror increases when the vibration is transmitted to an external structure. This extra power means a larger motor is required to insure that the motor can drive the display with sufficient amplitude, in turn, resulting in increased battery drain for portable displays.

This problem is even more serious if the system design requires that the mirror pivot about a point near the end of the mirror as opposed to near the center of the mirror. Such a design is desirable in a hand-held display application because it permits use of smaller lenses and results in a more compact display.

Accordingly, it is an object of the present invention to provide a resonant scanning unit for an optical display device in which the net reaction force transferred to the mounting base is reduced.

It is a further object of the present invention to provide a resonant scanning unit which reduces vibration in a resonant-scanning optical display device.

It is yet another object of the present invention to provide a resonant scanning unit which allows the electromagnetic motor which drives the mirror to operate in an efficient manner.

It is yet another object of the present invention to provide a resonant scanner construction which uses a counterbalanced mass construction to reduce the net reaction force transmitted to the mounting base.

It is still a further object of the present invention to provide a resonant scanning unit in which the pivot point about which the mirror oscillates is located at a distance from the mirror center.

SUMMARY OF THE INVENTION

The foregoing objects are achieved and the foregoing problems are solved in one illustrative embodiment of the invention in which a resonant scanning unit comprises a mirror and a counterbalance mass which move in opposing directions. As both masses are attached to the same mounting base, it is possible to configure the arrangement so that reaction forces caused by the moving masses are cancelled at the base, thereby substantially reducing overall vibrations.

More specifically, the mirror support consists of a "tuning-fork" configuration with the mirror mounted on one arm and a counterbalance mass mounted on the other arm. The driving motor comprises a magnet and coil structure which drives one or more of the arms so that the arms move in opposite directions.

In one embodiment, the mirror is mounted to the base of the display device by crossed flexure springs. A counterbalance mass is also connected to the base of the video display device by a spring. The stiffness of both the mirror flexures and the counterbalance mass spring are selected so that the mirror and counterbalance mass have substantially the same resonant frequency.

In this embodiment, a voice-coil electromagnetic motor is used to drive the mirror and the counterbalance mass. The motor comprises a permanent magnet portion and associated magnetic return path mounted on one arm of the tuning fork configuration and a coil mounted on the other arm. When a properly controlled current is applied to the coil, the permanent magnet is alternately attracted and repulsed from the coil. In this fashion, a driving force is applied to both the mirror and the counterbalance mass causing each to oscillate at the frequency of the driving force.

The spring forces which accelerate and decelerate the mirror and counterbalance mass are also applied by the flexure springs to the base, and constitute "reaction forces". The geometry of the counterbalance mass and the counterbalance mass pivot point location are both selected so that the reaction force applied to the base by the counterbalance mass substantially cancels the reaction force applied to the base by the mirror.

In addition, the geometry of the electromagnetic motor is selected so that the drive forces applied to the mirror and counterbalance mass are substantially equal to the air resistance forces acting on the mirror and counterbalance mass, with the result that little or no net force is applied to the base due to drive forces.

Another embodiment of the invention utilizes a molded plastic mirror mount, counterbalance mass mount and base in which the flexure springs are molded directly into the plastic pieces in order to simplify assembly and more precisely define the spring length and, therefore, the oscillation frequency of both the mirror and counterbalance mass. Since the spring length can be precisely controlled, the spring/mass systems of the mirror and counterbalance mass can be precisely tuned. Also, due to the fact that many of the parts are molded, this embodiment has a lower manufacturing cost because numerous tiny parts which require lengthy assembly time are eliminated.

This latter embodiment also uses tuning wires to fine tune the natural oscillation frequency of the counterbalance mass. Consequently, the mirror and counterbalance mass can be more precisely tuned to the same natural frequency of oscillation in order to cancel reaction forces at the base.

DETAILED DESCRIPTION OF PREFERRED EMBODIMENTS

Figure 1:
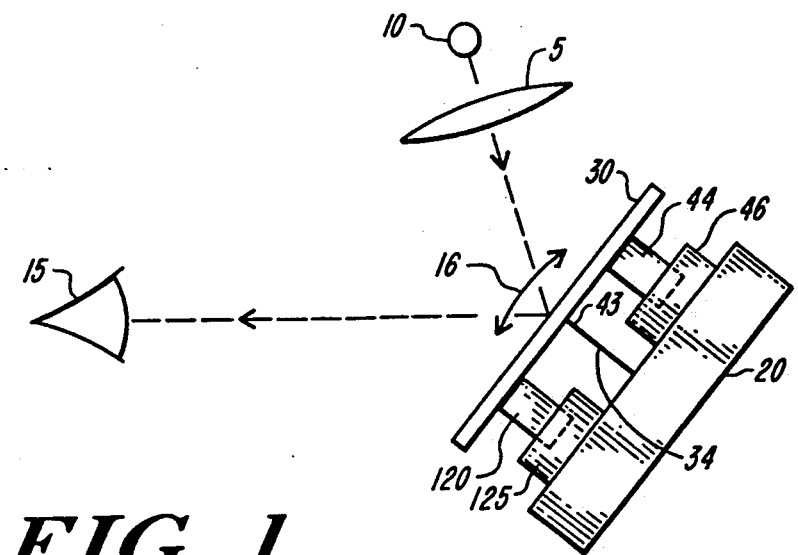
FIG. 1 is a schematic view of a typical prior art resonant electromechanical scanner.

FIG. 1 is a schematic diagram of a typical prior art resonant electromechanical scanner of the type shown in U.S. Pat. No. 4,632,501. As this device is explained in detail in the latter patent, it will not be fully discussed herein. In FIG. 1, the resonant scanner is used in a scanned image display device of the type covered in copending U.S. patent filed on July 27, 1987 under Ser. No. 078,295 and assigned to the same assignee as the present invention, now U.S. Pat. No. 4,934,773. As the display device is described in detail in that application, which is hereby incorporated by reference, only a brief description of the operation will be given here.

In a scanned image type of display device, a row of light emitting devices 10 (which may illustratively be light-emitting diodes) is electrically excited to selectively emit light thereby generating an illuminated line. In FIG. 1, the row of LEDs extends perpendicularly into the page.

The light from LED row 10 passes through an optical system schematically illustrated as lens 5, which creates an enlarged virtual image of the LED's. The image is reflected from mirror 30 to an observer's eye 15 as mirror 30 is repetitively oscillated in the direction of arrow 16. By selectively illuminating the LEDs in row 10 as mirror 30 moves, a rectangular raster can be formed which can be observed by the viewer.

The mechanism which moves the mirror is generally termed as a resonant scanner. It consists of a base 20 to which plane mirror 30 is attached by means of a flat spring 34 which extends perpendicularly into the page. Mirror 30 is oscillated by a drive motor consisting of two cylindrical permanent magnets 44 and 120 and two ring coils 46 and 125. In operation, one of coils 46 and 125, for example coil 125, is excited and the corresponding permanent magnet, 120, is either attracted into coil 125 or repulsed depending on the relative magnetic fields produced by coil 125 and magnet 120. The resulting force causes mirror 30 to pivot around the attachment point with spring 34 so that mirror 30 oscillates in the direction of arrow 16.

The remaining coil (coil 46 in the example) is used as a sensing coil to sense the motion of mirror 30. The electrical signals derived from the motion of magnet 44 relative to coil 46 are used by driving circuitry (not shown) to control the current provided to drive coil 125 in a conventional fashion and as described in the aforementioned U.S. Pat. No. 4,632,501.

In practice, the mass and geometry of mirror 30 and the spring constant of spring 34 are chosen so that a resonant mass system is formed at the desired operating frequency. In this manner, a large excursion angle for mirror 30 is produced by a driving force which is much lower than would be required if the mirror were driven in a non-resonant fashion.

The problem with the mirror driving system shown in FIG. 1 is that the spring forces which cause the mirror mass 30 to oscillate are also applied to base 20 and any supporting structures attached to base 20. Although mirror 30 is generally quite small, its motion is typically at a sufficiently high frequency that the forces are large in amplitude. These large amplitude forces are transmitted to base 20 causing it to vibrate in response.

Figure 2:
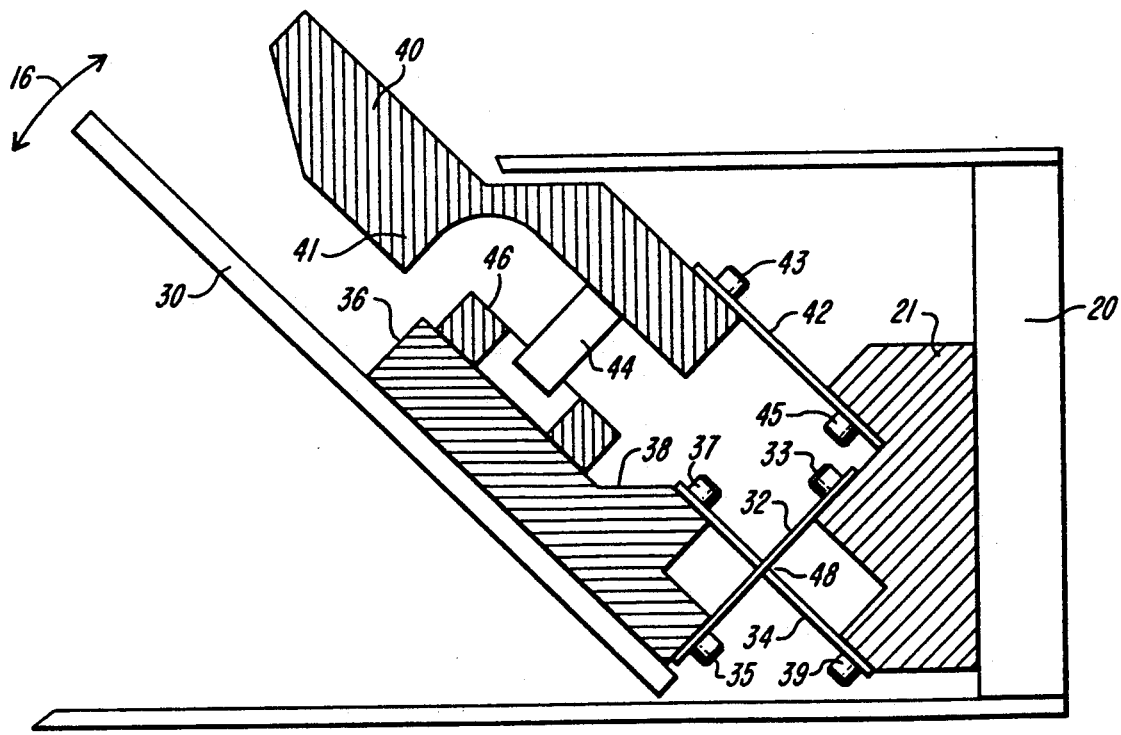
FIG. 2 is a partial cross-sectional view of a resonant scanner constructed in accordance with the present invention.

FIG. 2 shows a partial cross-sectional view of the mirror assembly of the present invention. The elements of FIG. 2 which correspond to those of FIG. 1 have been given the same numeral designations. In the FIG. 2 structure, mirror 30 is part of a balanced assembly with two arms. One arm comprises mirror 30, mirror support 36 and driving coil 46. The other arm consists of weight 40 and permanent magnet 44. The mirror arm is attached to base mounting 21 by means of two flexure springs 32 and 34. Springs 32 and 34 are both flat springs which extend into the page. As will be discussed hereinafter, two springs are used in a crossed arrangement to constrain rotation of the mirror assembly to a single axis.

Mirror 30 is directly attached to a mirror support 36 (which may be comprised of a suitable plastic or other material) by means of adhesive or cement. One end of spring 32 is attached to mirror support 36 by means of a screw or rivet or other fastener. The other end of spring 32 is attached to base mounting 21 by means of another fastener. A second spring, 34, is also attached to mirror support 36 by fastener 37 and to base 21 by fasteners 39. Although not explicitly shown, rectangular washers would generally be used with fasteners 39 in order to mechanically define the flexing point of the spring. The two flexure springs 32 and 34 act together so that mirror 30 and mirror support 36 effectively pivot around the point 48 at which springs 32 and 34 cross. Under influence of the driving motor, the mirror arm oscillates in the direction of arrow 16 around point 48.

Weight 40 is attached to the one end of spring 42 by means of fastener 43. Spring 42 is also a flat spring extending into the page. The other end of spring 42 is attached to base 21 by means of fastener 45. Weight 40 thus effectively pivots around an intermediate point located on spring 42 between attachment points 43 and 45.

Mirror 30 and weight 40 are driven by a voice-coil type electromagnetic motor consisting of permanent magnet 44 weight 40 and coil 46. Magnet 44 is rigidly secured to weight 40, while the coil 46 is rigidly secured to mirror support 36. Weight 40 is shaped with an overhanging portion 41 which acts to complete the magnetic flux return path and improve the efficiency of the motor. Circuitry is provided (not shown) to supply a sinusoidal current (or other periodic current, such as a square wave or current pulses) to the electrical coil 46. In accordance with one feature of the invention, the electrical connections between coil 46 and the driving circuitry are provided through springs 32 and 34 in order to avoid separate wires which are subject to fatigue from flexing.

The sinusoidal current in coil 46 generates a fluctuating magnet field which causes magnet 44 and coil 46 to be alternately attracted and repelled at the frequency of the current. The frequency of the sinusoidal driving current is chosen so that mirror 30 rotates through an arc segment at the resonant frequency of the spring-/mass system consisting of mirror 30 and spring 32. Generally, the desired resonant frequency will depend upon the use of the scanner. In a scanned image display system as previously mentioned, the proper resonant frequency depends on the minimum display refresh rate to eliminate display "flicker". The resonant frequency can be selected in a conventional fashion by choosing the mass and geometry of mirror 30 and the spring constant of spring 32.

Advantageously, the use of the illustrative structure allows a light-weight drive coil to be placed on the mirror assembly rather than requiring a heavy magnet structure to be placed on the mirror assembly. This arrangement, in turn, allows the electromagnetic drive motor to be designed for efficient operation because the permanent magnet structure on the counterbalance arm can be large and heavy in order to produce a high magnetic field strength without contributing to the mass of the mirror arm.

Figure 3A:
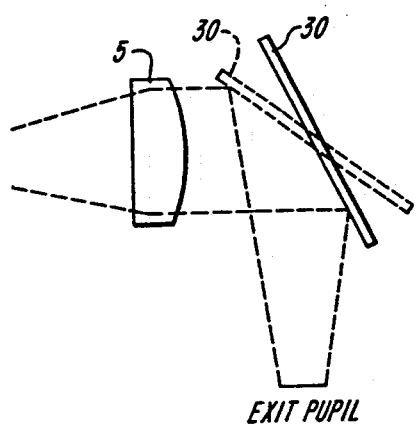
FIG. 3A is a schematic diagram of a miniature display using a scanning mirror which is pivoted near the mirror center.
Figure 3B:
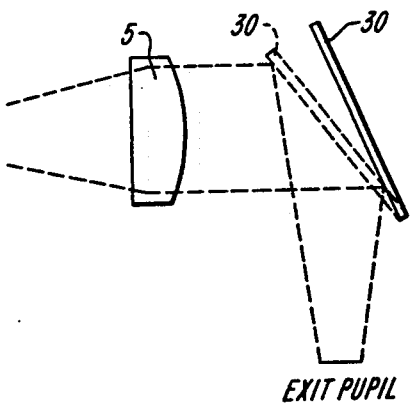
FIG. 3B is a schematic diagram of a miniature display using a scanning mirror which is pivoted near the mirror end.

When used in a scanned image display, the illustrative scanner has an additional benefit. Since the effective mirror pivot point 48 is located away from the center of mirror 30, a smaller mirror can be used to produce an optical system with a given "exit pupil". This advantage is illustrated in FIGS. 3A and 3B which show two display systems each utilizing an oscillating scanner mirror. Elements and locations in FIGS. 3A and 3B which are equivalent to those elements and locations shown in FIG. 2 are given the same numeral designations.

Exit pupil 110 is defined as the area in which the user's eye 15 can be placed so as to see the entire image. In FIG. 3A, a display system is constructed with a mirror pivoted near the center. As shown in the figure, the size of the exit pupil 110 is dependent on the arc through which the mirror swings and the geometry of the display. In FIG. 3B, an exit pupil which has the same size as the exit pupil in FIG. 3A can be achieved with a significantly smaller lens 5 and case size when the mirror is pivoted near one end according to one aspect of the present invention.

Figure 4:
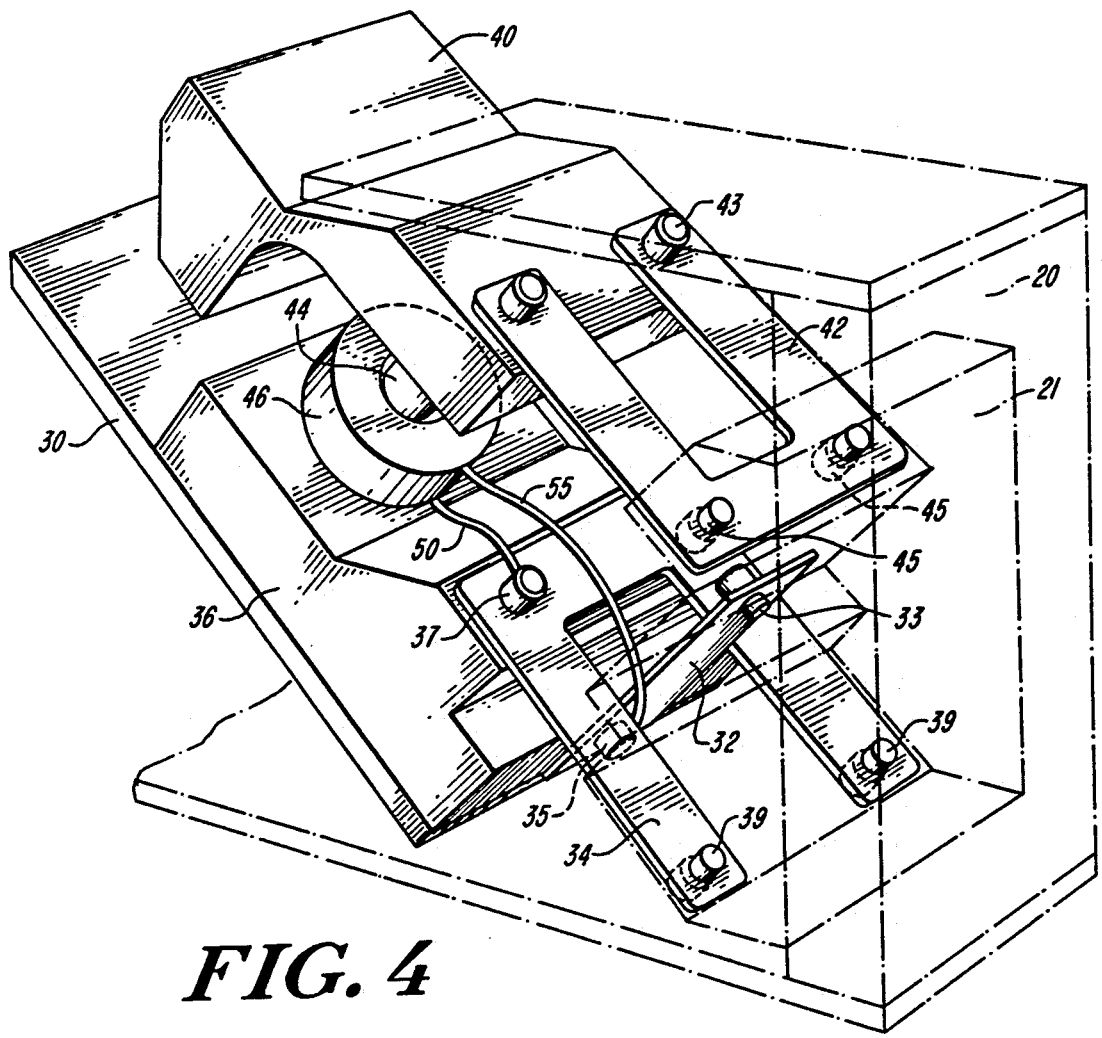
FIG. 4 is a perspective view of the resonant scanner shown in FIG. 2.

FIG. 4 shows a partial perspective view of the illustrative embodiment of the resonant scanning unit with an accompanying housing shown in partial phantom detail. FIG. 4 illustrates the connection of flexure springs 32, 34 and 42 between mirror 30 and weight 40 and the base mounting 21. In FIG. 4, components which are equivalent to those shown in FIG. 2 are given the same numeric designations.

Flexure spring 34 is illustratively a U-shaped spring made out of a single layer of flat spring material. Similarly, flexure spring 32 is a single layer flat spring which is mounted between the legs of spring 34 at a right angle to the plane of spring 32. This "crossed" spring design constrains movement of mirror mass 30 to essentially pure rotation whereas the single spring design common in conventional units is subject to undesirable twisting movements. Spring 42 is another U-shaped spring which fastens weight 40 to base 21.

The design of the mirror assembly and counterbalance mass in order to accomplish cancellation of the reaction forces can be carried out in a conventional manner. In particular, in accordance with conventional mechanical design theory, the reaction forces on a mass/spring system can be represented by a pair of force vectors which act at a conceptual "point of percussion". Although the actual moving part will have both mass and rotary moment of inertia these may be modeled as an equivalent point mass located at the point of percussion.

A secondary force vector passes through the point of percussion and the system pivot point and represents centrifugal force. A primary force vector passes through the point of percussion and is perpendicular to the secondary force vector and represents the force needed to translate and rotate the mass about the pivot point.

In operation, in the illustrative resonant scanner, the primary force vector has a relatively large sinusoidal magnitude which causes the mirror to accelerate back and forth (the magnitude of the force is greatest at the extreme ends of travel of the mirror). This force depends only upon the equivalent mass of the mirror assembly and the amplitude of mirror travel and, with proper pivot point placement and design, can be substantially cancelled by the reaction forces generated by the counterbalance mass. Specifically, the geometry of the mirror and counterbalance mass must be adjusted so that the primary force vectors are co-linear. In an illustrative embodiment constructed in accordance with the invention and operating at a scan frequency of 50 Hz., it has been found that this force is approximately 42 grams-force (gmf). It has been found that with a mirror mass of 3.36 grams, a counterbalance mass of 10.95 grams has produced effective cancellation of this force.

A much smaller drag force also acts upon the mirror assembly. This force is primarily a velocity-proportional force due to air resistance. In the previously mentioned illustrative embodiment constructed in accordance with the principles of the invention, the "Q" value for the mirror assembly alone is approximately 100 resulting in a drag force of about 0.4 gmf (the "Q" value is a measure of damping and has to do with the sharpness of the resonant peak). In order to make up for the energy lost due to the drag forces, voice coil motor 46 supplies a force to move mirror 30. If the drive force is a sine wave it can be made to substantially balance the previously-mentioned force resulting from drag.

Similarly, a drag force also acts on the counterbalance assembly. In the preferred embodiment described above, this latter force is approximately 0.2 gmf, corresponding a to "Q" of 200 for the counterbalance mass alone. The "Q" of the mirror assembly alone is lower because of its larger surface area. To minimize any extraneous forces resulting from imperfectly cancelled motor forces, in the illustrative embodiment, the motor torque exerted on the mirror and the counterbalance mass by the voice coil motor must be in the ratio of 0.4/0.2. The geometry of the illustrative embodiment has been designed to substantially accomplish this result.

Although a sinusoidal drive force applied in the correct ratio theoretically results in substantially zero net drive-related forces applied to the base, a non-sinusoidal drive force can also be used. If the drive force is periodic but not sinusoidal, a small net force will be applied to the base, but this force may be acceptable in view of simplifications possible in the motor drive circuitry.

Further, since the equivalent mass of the mirror moves in a slight arc rather than in a straight line, there is also secondary force vector (mentioned earlier) caused by the transverse motion of the equivalent mass. This secondary force vector represents centrifugal force. The magnitude of this secondary force vector is substantially sinusoidal and has a frequency twice the frequency of the mirror motion. The double-frequency force will cause a slight vibration of the device base or, if the base is prevented from moving, the reaction force will be transferred to the supporting structure. A similar force acts on the counterbalance mass assembly. With the mirror and counterbalance configuration shown in the illustrative embodiment, the double-frequency forces for the mirror assembly and the counterbalance mass assembly are in the same direction and, consequently, do not cancel. However, as the extent of the transverse movement of the mirror and counterbalance masses is very small for example, in the illustrative embodiment approximately ±42 μm for the mirror and ±5 μm for the counterbalance mass, the vibration which is produced is acceptable. When incorporated in a display of total weight 42 gm, the resulting case vibration would be ±7 μm.

It is also possible to mount the scanner assembly in a compliant mount which can allow slight motion of the display case so that vibrations caused by unbalanced forces do not cause vibration of the structure to which the display is attached.

FIG. 4 also shows the electrical connections of coil 46 through flexure springs 32 and 34. Since two separate flexure springs, 32 and 34, are used to support mirror 30 these springs may also be used in order to carry electrical current to coil 46 and, thus, eliminate the use of separate wires which may be subject to breakage due to repeated flexing. In particular, one electrical lead, 50, of coil 46 is attached to flexure spring 34 by means of fastener 37. Another electrical lead, 55, is attached to flexure spring 32 by means of fastener 35. Electrical connections to coil 46 can be completed by making appropriate electrical connections to the other ends of the flexure springs 32 and 34 at fasteners 33 and 39, respectively. Current is thus carried along the flexure springs directly to coil 46.

FIGS. 5-8 show an alternative embodiment of a resonant scanner unit that uses a preferred construction of the voice coil motor. This preferred construction increases motor efficiency by achieving higher magnetic field strength in the air gap. With a motor construction as shown in FIGS. 2 and 4, inefficiency results because the air gap between the inside diameter of toroidal coil 46 and magnet 44 must be sufficient to accommodate the varying arcs through which mirror 30 and weight 40 move. The relatively large tolerance which is required in order to prevent physical collisions results in high flux leakage and low field strength in the air gap, and, thus, in poor motor efficiency.

Figure 5:
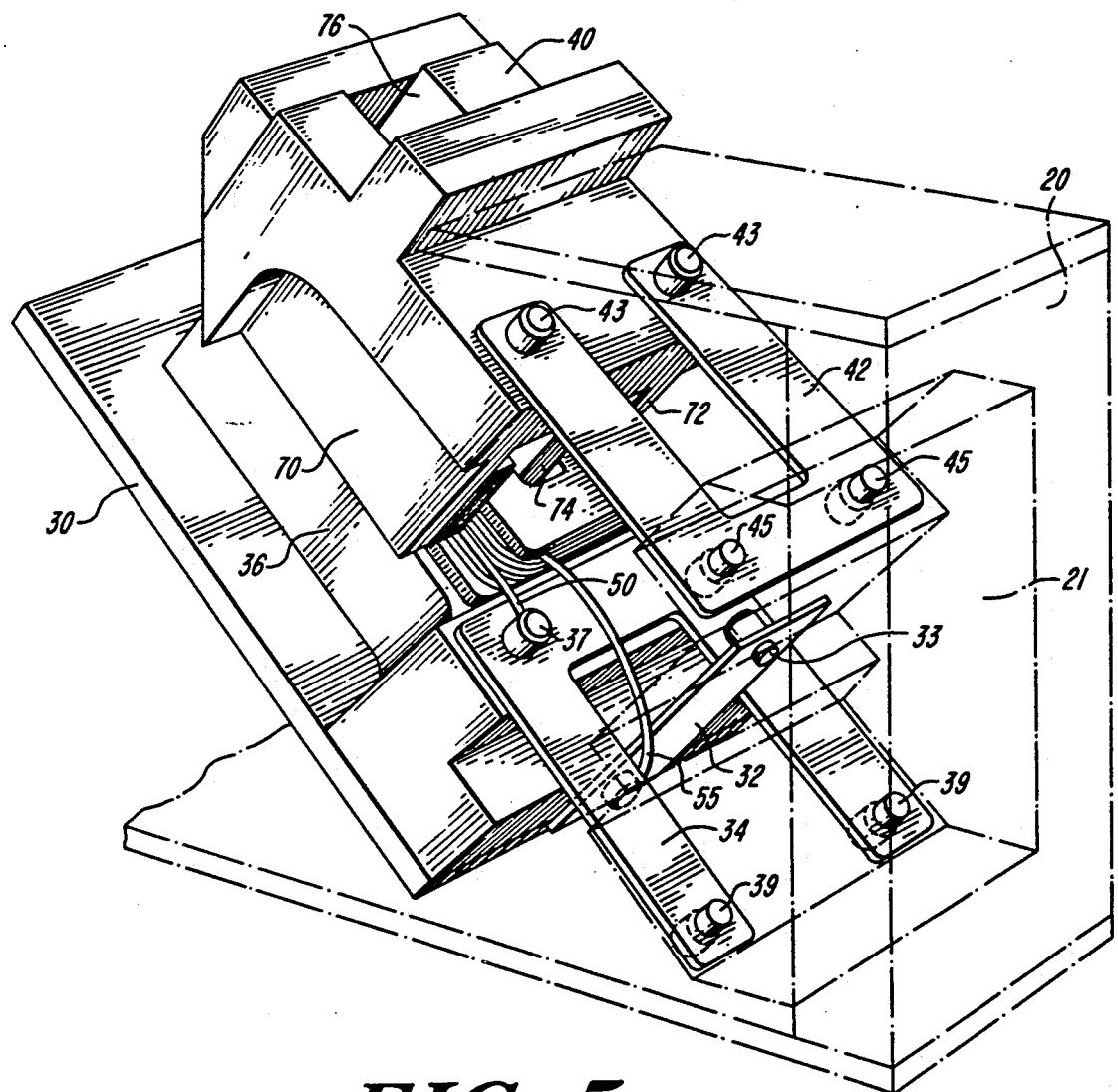
FIG. 5 is a perspective view of a preferred embodiment of a resonant scanner utilizing a drive motor with improved efficiency.
Figure 6:
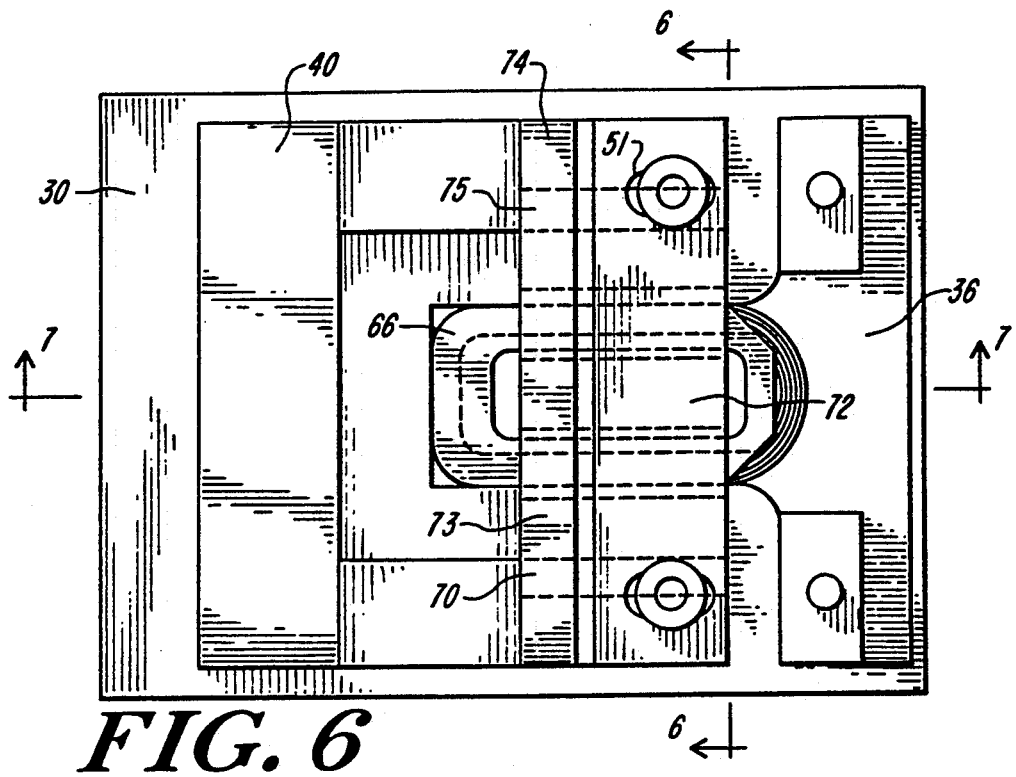
FIG. 6 is a plan view of the preferred drive motor construction showing the mirror assembly overlaid by the counterbalance mass. Spring 42 which connects the mirror assembly to the base has been omitted for clarity.
Figure 7:
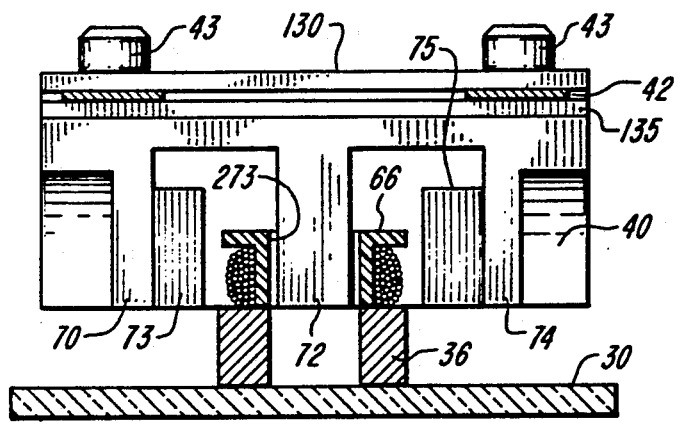
FIG. 7 is a cross-sectional view of the preferred drive motor embodiment taken along the line 6—6 shown in FIG. 6.
Figure 8:
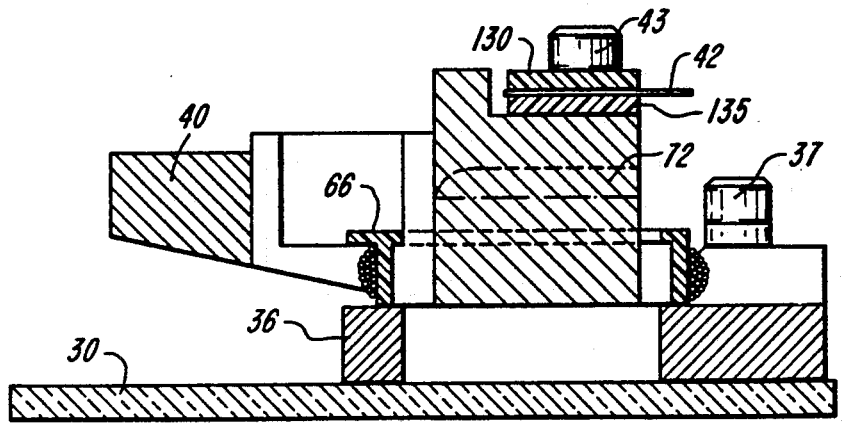
FIG. 8 is another cross-sectional view of the preferred drive motor embodiment taken along the line 7—7 shown in FIG. 6.

The motor design shown in FIGS. 5-8 improves motor efficiency by optimizing the magnetic circuit to reduce leakage flux. Parts of the assembly which remain the same as the embodiments shown in FIGS. 2 and 4 are designated with the same numerals. In particular, the toroidal-shaped coil 46 shown in FIG. 4 is replaced by a rectangular coil 66 shown in FIGS. 5 and 6. Instead of a single cylindrical magnet 44 as shown in FIG. 4, weight 40 has been modified to have an "E" shape with three fingers, 70, 72 and 74 shown in the cross-sectional view of FIG. 7. Central finger 72 fits into the rectangular opening 273 in coil 66 as shown in FIGS. 7 and 8. The two side fingers 70 and 74 are provided with magnets 73 and 75 which lie on the outside of coil 66 as shown in FIGS. 7 and 8.

Also shown in FIG. 5 is a slot 76 which is cut in weight 40. This slot, as will hereinafter be described, is used to accommodate a mechanical sensor that senses the position of mirror 30 and generates electrical signals which control the driving current to ensure that mirror 30 and weight 40 oscillate at the desired resonant frequency.

FIGS. 6-8 also shown an improved mechanism for attaching spring 42 to weight 40. As shown, spring 42 is clamped between two clamping members 130 and 135. Clamp members 130 and 135 have slots 51 (shown in FIG. 6) which allow the members to be slid over fasteners 43. The ends of spring 42 which are fastened by fasteners 43 are not slotted, thus the distance between the weight 40 and base 21 is mechanically fixed. However, clamping members 130 and 135 can be moved relative to weight 40, thus effectively changing the attachment point of spring 42 to weight 40. Thus, the effective spring length can be changed for the purposes of adjusting the resonant frequency without changing the basic geometry of the device.

Figure 9:
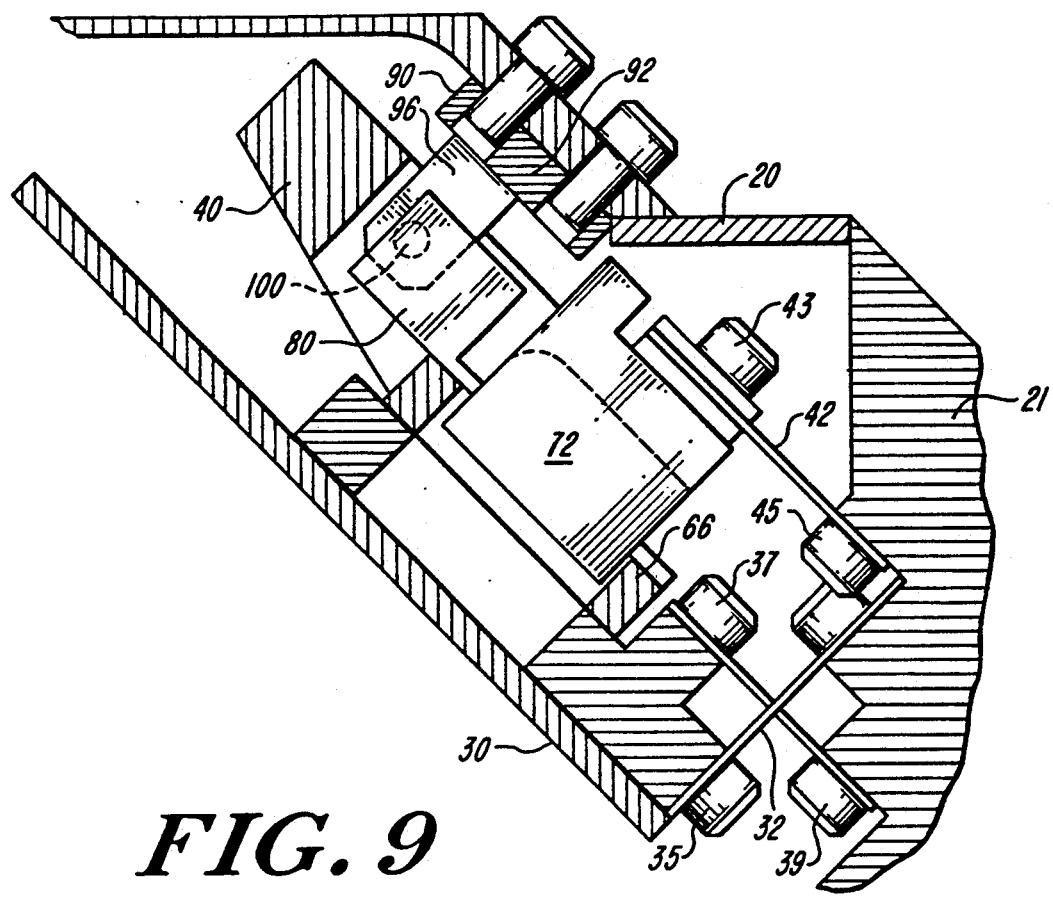
FIG. 9 is a longitudinal cross section of another embodiment using a sensor flag to sense position of the mirror 30.
Figure 10:
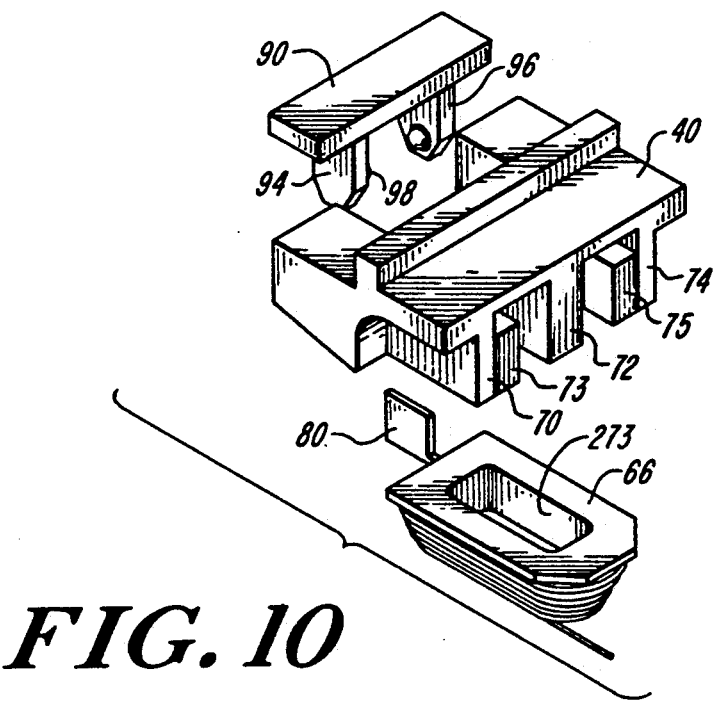
FIG. 10 is a partial exploded view of a portion of the embodiment shown in FIG. 9 showing the voice coil with sensor flag, the counterbalance mass and the sensor assembly.

FIG. 9 is a partial cross-section of the resonant scanning unit of FIGS. 5-8 fitted with a position sensor mechanism. The main components of this mechanism are also depicted in the partial exploded view shown in FIG. 10. The sensor mechanism consists of a "flag" 80 which is mounted on one end of rectangular coil unit 66. When the unit is assembled, flag 80 extends between the two arms of LED/photocell sensing unit 90. As shown in FIG. 10, sensing unit 90 consists of a mounting bracket 92 which is affixed to the scanner housing as shown in FIG. 9. Two arms 94 and 96 extend from the bracket 92 and lie on either side of flag 80. An LED device 98 is mounted on arm 94 and a photo diode 100 is mounted on arm 96.

In operation, when mirror 30 rotates through an angle which exceeds approximately 70% of the maximum normal operating angle, light emitted from LED 98 is sensed by photo diode 100 which thereupon generates an electrical signal. When the angle of rotation of mirror 30 is less than approximately 70% of the maximum normal operating angle, flag 80 is interposed between LED 98 and photo diode 100, in turn, preventing light emitted from LED 98 from reaching diode 100. The signal emitted from diode 100 thereupon ceases. Consequently, as mirror 30 and weight 40 oscillate, an oscillating electrical signal is developed by photo diode 100. This oscillating signal is used to control the driving electronics which provide the current to the coil 66 of the electromagnetic driving motor.

Figure 11:
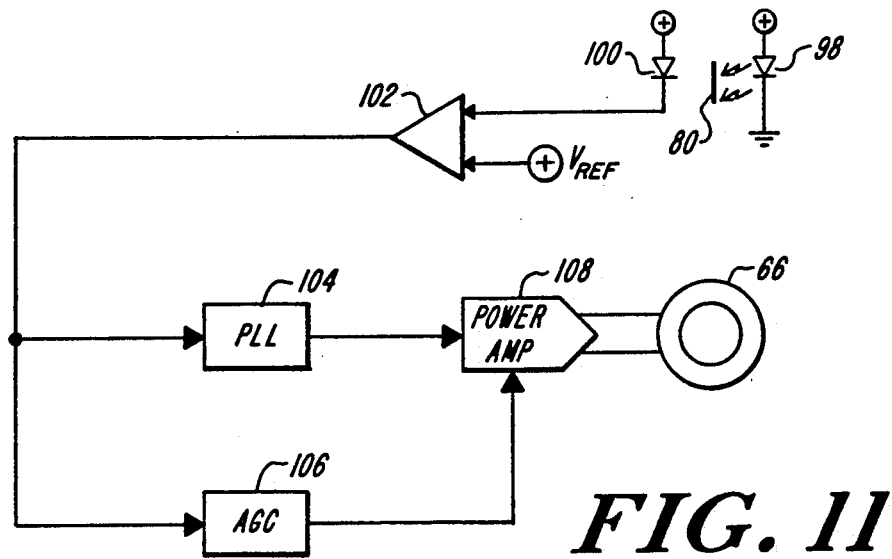
FIG. 11 is an electrical schematic diagram of an illustrative drive circuit.

A schematic block diagram of the driving circuit electronics is shown in FIG. 11. The basic components of the circuit consists of a comparator 102, a phase-locked loop 104, an automatic gain control circuit 106 and a power amplifier 108. The components are arranged in a conventional frequency control loop. More particularly, the oscillating output signal developed by photo diode 100 is provided to one input of comparator 102. Comparator 102 compares the voltage signal level to a reference voltage in order to standardize the waveform and sharpen the zero crossing points. The output of the comparator is a pulse-train signal which is used to drive the remainder of the circuitry.

The output from comparator 102 is provided to a conventional phase-locked loop circuit 104 which is adjusted to maintain the frequency of oscillation at the desired value. The operation of such a phase-locked loop is conventional and will not be explained hereinafter in detail. Circuit 104 generates control signals which control the power amplifier.

The output of comparator 102 is also provided to a conventional automatic gain control circuit 106 which generates a magnitude control signal.

The control signals generated by phase-locked loop circuit 104 and AGC circuit 106 are provided to power amplifier which provides the driving current to the voice coil and completes the feedback loop.

Figure 12:
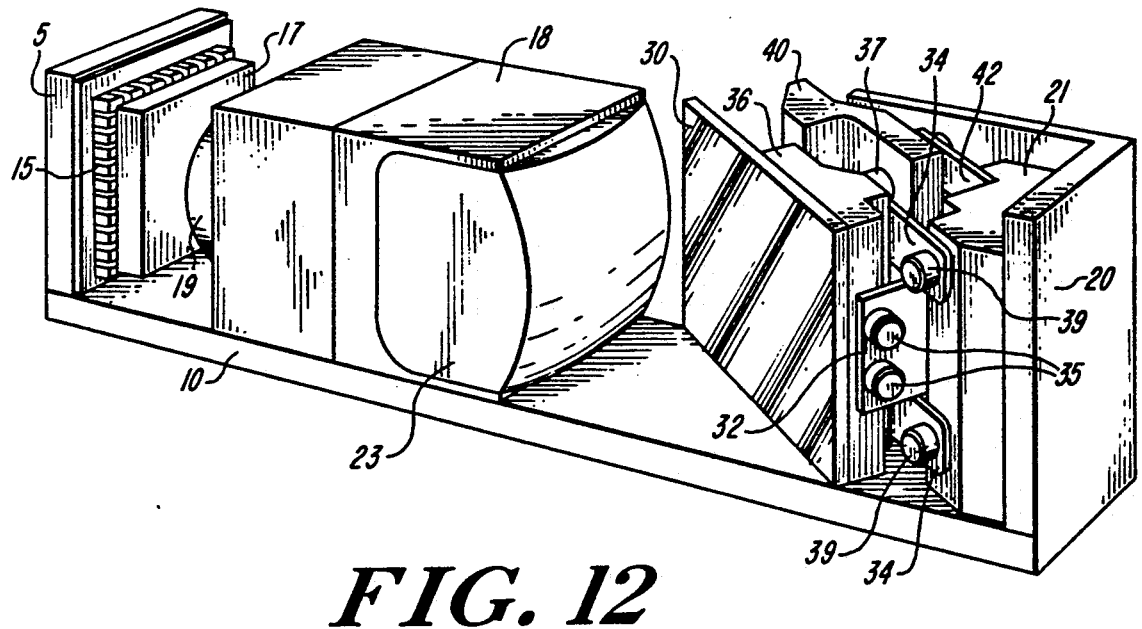
FIG. 12 is a perspective view of a miniature optical display device utilizing an illustrative embodiment of the inventive scanner unit.

FIG. 12 of the drawing shows an illustrative embodiment of the resonant scanning unit incorporated into a miniature display device. The miniature display device is of the type described in detail in aforementioned copending U.S. patent application Ser. No. 078,295. The operation and construction of the display device is discussed in detail in that application which is hereby incorporated by reference, and will not be repeated in detail herein for clarity. The display device consists of a base 10 on which the various optical components which comprise the display are mounted. At one end of base 10 is mounted the header block 5 in which an array of light-emitting devices 15 (such as light-emitting diodes) is attached. Generally, such an array may be a linear array comprising two rows of devices which are staggered in order to compensate for gaps between the devices. The devices are covered by a clear cover plate 17.

Light emitted from devices 15 is projected on mirror 30 by means of an optical system which consists of housing 18 in which are mounted lenses 19 and 23. In accordance with the principles set forth in the aforementioned U.S. patent application Ser. No. 078,295 the lens system projects the image of array 15 via mirror 30.

Mirror 30 is actuated by providing a periodic current via leads 50 and 55 (shown in FIG. 4) to coil 46, causing mirror 30 and weight 40 to oscillate. The oscillation of mirror 30, in turn, creates a raster image from linear array 15.

The resonant scanner embodiment shown in FIGS. 2-10 operates in a satisfactory manner and achieves the objects of the invention. However, it has been found that the design is relatively time-consuming and expensive to manufacture because it utilizes numerous tiny parts which require a long time to assemble and are expensive. In addition, during assembly, the small parts must be held to tight tolerances resulting in additional expense. For example, it has been found that compounding of mechanical tolerances between the base 21, mirror support 36 and counterbalance mass 40 during assembly requires a careful adjustment of the photosensor unit 90 (shown in FIGS. 9 and 10) to insure that, during operation, the photosensor does not rub against the counterbalance mass 40 or mirror flag 80.

Further, it has been found that the oscillation frequency of the mirror 30 and counterbalance 40 are extremely sensitive to the effective free spring length of springs 32, 34 and 42. Since the oscillation frequency must be precisely tuned to achieve the reaction force cancellation effect previously mentioned, it is necessary to carefully control the free spring length of springs 32, 34 and 42.

In the embodiments previously discussed, the effective free spring length is the free length of the spring between the clamping members at either spring end. For example, spring 42 is shown in FIGS. 7 and 8 is clamped between clamping members 130 and 135 at one end and clamped to support 21 at the other end. Clamping members 130 and 135 can be slid over screws 43 by means of oversized holes 51 as previously described to change the free spring length. However, if clamping members 130 and 135 have slightly rolled edges (as might be formed when the clamping members are stamped out of a piece of sheet metal) it has been found that it is difficult to correctly set the spring length and, thus, the oscillation frequency of the counterbalance mass without precise, repeated and time-consuming adjustments.

Also, in the embodiments shown in FIGS. 2–10, physical contact of dissimilar metals such as base 21 and springs 32, 34 and 42 rubbing together leads to fretting corrosion and reduced life of the units.

Figure 13:
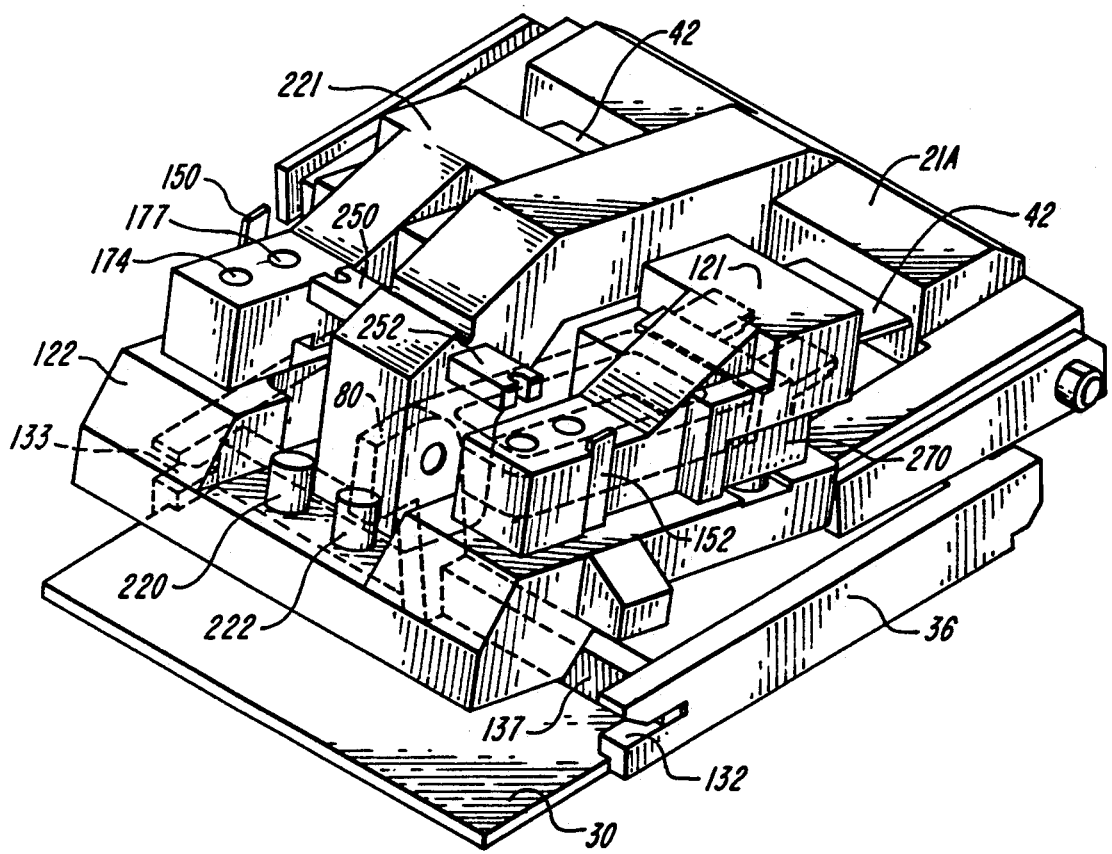
FIG. 13 is a perspective view of an additional embodiment of the inventive resonant scanner utilizing injection-molded plastic parts.
Figure 14:
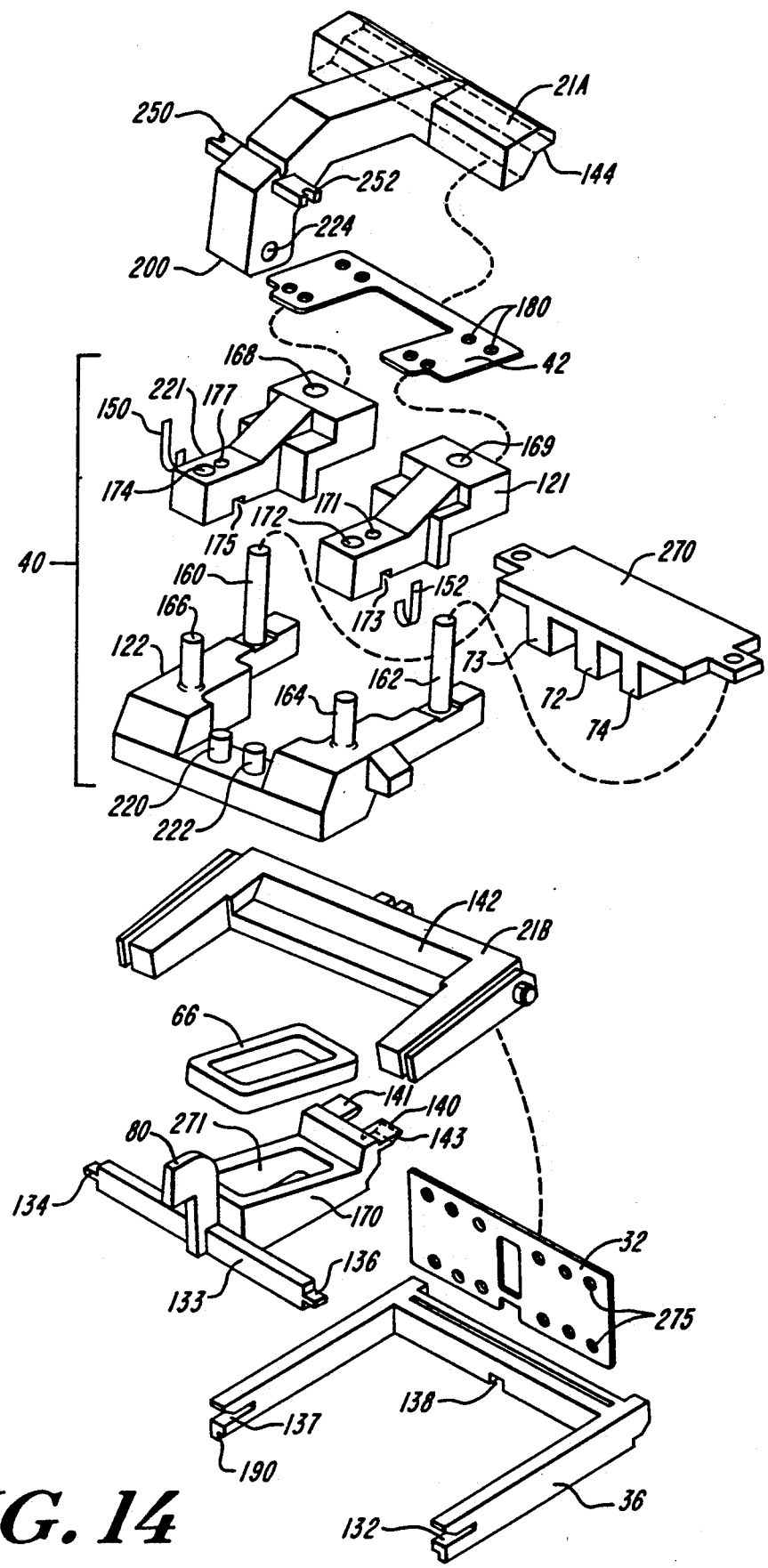
FIG. 14 is an exploded assembly diagram of the resonant scanner embodiment shown in FIG. 13.
Figure 15:
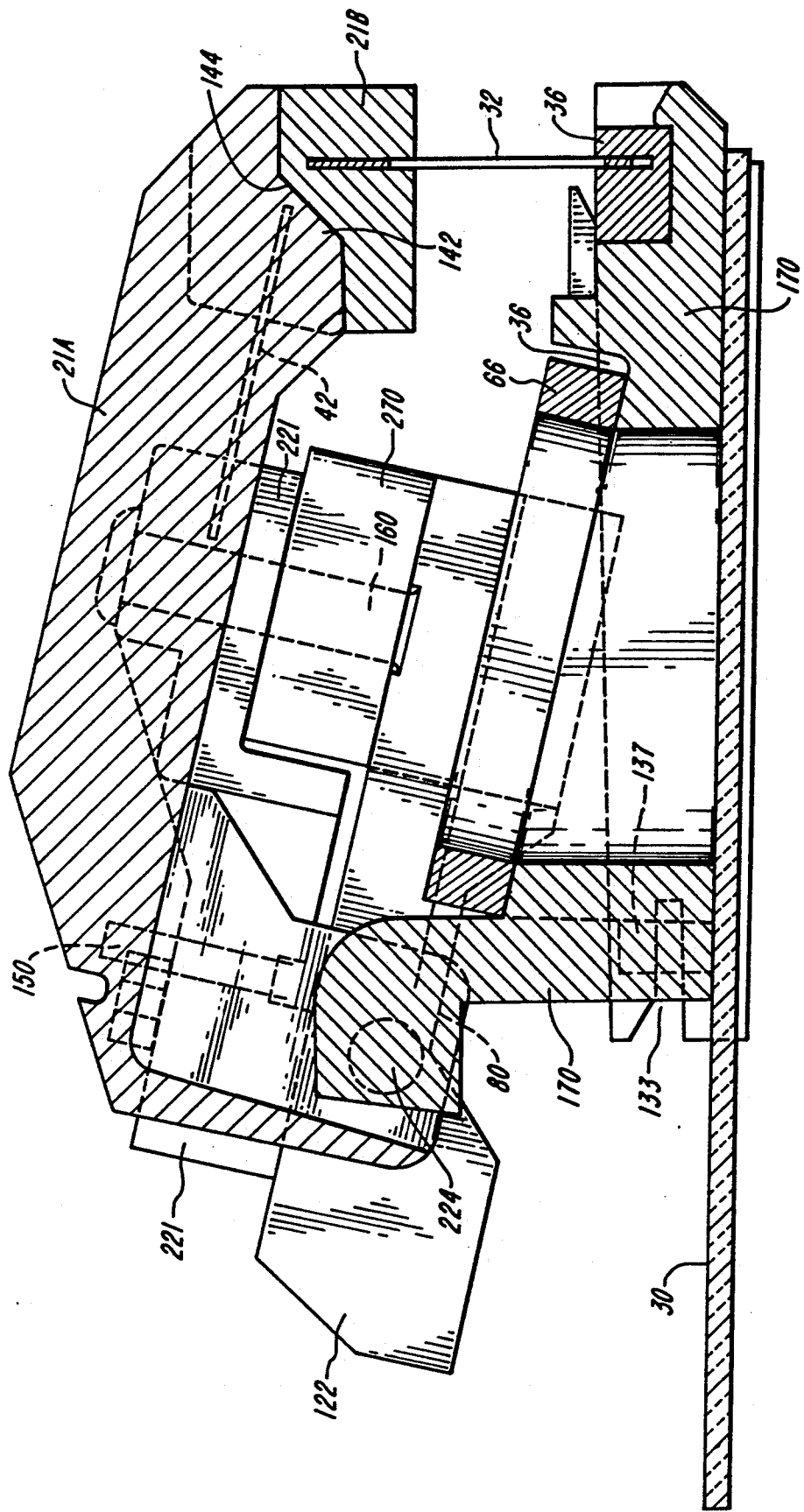
FIG. 15 is a partial cross-sectional view of the molded plastic scanner embodiment shown in FIGS. 13 and 14.

In accordance with the invention, another embodiment of the inventive resonant scanner shown in FIGS. 13–15 overcomes the latter problems encountered with the aforementioned illustrative embodiments. In the embodiments shown in FIGS. 13–15, additional features have been incorporated in order to reduce the assembly time and expense. In particular, the mounts for mirror 30 and counterbalance mass 40 have been fabricated from molded plastic material and the flexure springs for both counterbalance mass 40 and the mirror 30 are directly inserted into the plastic mount pieces during the molding process. Thus, the spring length and the oscillation frequencies can be precisely defined without requiring expensive and time-consuming adjustments after assembly. In addition, the photosensors are integrated into the counterbalance mount insuring good alignment by eliminating mechanical assembly tolerances which can compound.

Advantageously, in this latter embodiment, counterbalance mass 40 has been fabricated from an assembly of molded pieces instead of machined from a solid block, thus the fabrication and cost of the device is reduced.

In order to precisely tune the resonant frequency of the counterbalance mass to achieve reaction force cancellation in accordance with the invention, tuning wires have been incorporated into this latter embodiment. As will be hereinafter explained, bending a tuning wire causes a slight mass shift which, in turn, changes the natural oscillation frequency of the counterbalance mass, thus, allowing the oscillation frequency to be precisely tuned.

A perspective view of the illustrative molded embodiment is shown in FIG. 13; a corresponding exploded view is shown in FIG. 14 and a partial cross-sectional view taken along the center line of the unit shown in FIG. 13 is shown in FIG. 15. In FIGS. 13–15, elements which correspond to the scanner elements disclosed in FIGS. 2–10 have been designated with equivalent numerals.

Referring generally to FIGS. 13–15 and, specifically, to FIG. 14, base member 21 which supports the counterbalance mass 40 and mirror 30 is comprised of two subunits, 21A and 21B. Illustratively, these parts may be fabricated by an injection molding process of a thermoplastic material. Base subunit 21B, together with flexure spring 32 and mirror frame 36, comprises the mirror mount portion of the illustrative scanner embodiment. Base subunit 21A, flexure spring 42, counterbalance pieces 221 and 121 and weight unit 122 form the counterbalance mount assembly.

Advantageously, in accordance with one aspect of the invention, base subunit 21B, flexure spring 32 and mirror frame 36 are molded together to form a single piece so that flexure spring 32 is an integral part of the mirror mount assembly. During the molding process, holes 275 provided in spring 32 allow the plastic material to creep into the spring, thereby locking the spring into the plastic pieces. This integral molded assembly allows the effective length of spring 132 to be precisely defined between the molded plastic pieces during the manufacturing process and eliminates time-consuming adjustments after assembly.

In order to complete fabrication of the mirror mount assembly, a mirror 30 (not shown in FIG. 14) is glued into slot 190 of mirror frame 36. A coil mount 170, which holds coil 66 of the aforementioned electromagnetic motor, is then snapped into the mirror frame 36. Cross piece 133 of coil mount 170 has two ears 134 and 136 which fit into slots 137 and 132, respectively of mirror frame 36 and tab 140 slides into slot 138. Tab 140, together with tabs 141 and 143, hold coil mount 170 in mirror frame 36. Coil 66 is then glued into recess 271 to complete the mirror mount assembly.

Counterbalance mass assembly 40 is comprised of several plastic and metal parts which can be easily molded and assembled as a unit. In particular, counterbalance mass assembly 40 is connected to base subunit 21A by means of a flexure spring 42. As with the mirror mount assembly, spring 42 is molded directly into base subunit 21A and counterbalance mass pieces 221 and 121. Holes 180 in spring 42 allow the plastic molding material to enter the spring and lock it in place. Consequently, as with the mirror mount assembly, the integral construction of base subunit 21A, spring 42 and counterbalance mass pieces 221 and 121 precisely define the effective free length of spring 42 and eliminate further spring length adjustment.

In addition to counterbalance mass pieces 221 and 121, the counterbalance mass unit is completed by weight unit 122 (which has a shape that can easily be molded from metal such as zinc or lead, as appropriate) and a magnet support 270.

Magnet support 270, as with the previous embodiments, is an "E" shaped element which has three fingers, 70, 72 and 74. Magnets (not shown) are attached to finger 70 and 74 as in the previous embodiments to complete the magnet element. During assembly of the counterbalance mass unit, magnet support 270 is slipped over and held by posts 160 and 162 of weight unit 122.

Also during assembly of the counterbalance mass unit, tuning wires 150 and 152 are inserted into the counterbalance mass pieces 221 and 121. In particular, wires 150 and 151 are "J" shaped wires which fit into slots in counterbalance pieces 221 and 121 and are trapped between pieces 221 and 121 and weight unit 122 during assembly. For example, tuning wire 152 is positioned such that the "short end" of the "J" shaped wire fits into slot 173 and extends up through hole 171 in piece 121. Similarly, the "short" end of "J" shaped tuning wire 150 fits into slot 175 and extends up through hole 177. The adjustment of the tuning wires to tune the oscillation frequency of the counterbalance mass will be described in detail hereinafter.

After magnet support 270 and tuning wires 150 and 151 have been placed in position, counterbalance mass pieces 221 and 121 are slid over weight unit 122, trapping magnet support 270 and tuning wires 150 and 151. Posts 160, 162, 164 and 166 of weight unit 122 fit into holes 168, 169, 172 and 174 of counterbalance pieces 221 and 121, respectively. The counterbalance mass assembly is completed by swaging or upsetting the tops of posts 160 and 162 to hold the entire assembly together.

In a final assembly step, the mirror mount unit is attached to the counterbalance mass unit by securely attaching base subunit 21A to base subunit 21B. This attachment can be accomplished by cementing surfaces 142 and 144 together or by ultrasonically welding these surfaces together.

When the scanner is fully assembled as shown in FIGS. 13 and 15, a flag 80 on the coil mount 170 extends into a slot 200 of the base subunit 21A. A photo diode/photocell unit (not shown) can be mounted on pins 220 and 222 of weight unit 122 allowing the light from the photodiode to shine through hole 224 in base subunit 21A and control the oscillation of counterbalance mass unit 40 as previously described. A photo emitter suitable for use with this illustrative embodiment is a part number OP-240-SLA manufactured by TRW Electronics Components Group, 1215 W. Crosby Drive, Carrolton, Tex., 75006. A suitable photodetector is a part number OP-550-SLA manufactured by TRW. The completed scanner can be mounted to a housing (not shown) by means of attachment ears 250 and 252.

After assembly the oscillation frequency of counterbalance mass 40 can be precisely tuned by means of tuning wires 150 and 151. When wires 150 and 151 are initially inserted into counterbalance mass assembly 40, the free legs of the "J" shaped wires are initially approximately parallel to the centerlines of posts 160, 162, 164 and 166. To tune the counterbalance mass frequency, wires 150 and 151 are manually bent to change the position of the free leg. If the free leg is bent toward spring 42, a small amount of mass is moved towards the counterbalance mass pivot point. The mass movement lowers the rotary moment of inertia of counterbalance mass 40 which, in turn, raises the oscillation frequency. Illustratively, with copper wires, bending both wires as far as possible towards spring 42 raises the counterbalance oscillation frequency about 1/10 hertz. Conversely, bending the wires as far as possible away from spring 42 lowers the oscillation frequency about 1/10 hertz.

Having thus described several preferred embodiments of the present invention it will be apparent to those skilled in the art that various modifications and alterations are possible without departing from the spirit and scope of the invention. For example, instead of the pair of flexure springs used to support the mirror assembly, other conventional arrangements such as four-bar linkages (in which each end of the mirror is attached to the base by means of a separate link) may be used without departing from the spirit and scope of the invention. Similarly, a different geometrical arrangement can be used in which the mirror is attached to the base at the center rather than at one end. The invention is not intended to be limited to the preferred embodiment disclosed above. It is limited in scope by the following claims.

What is claimed is:

1. In a resonant electromechanical scanning unit having a base, a mirror, a mirror frame attached to said mirror, a first spring connecting said mirror frame to said base to allow said mirror and said mirror frame to oscillate relative to said base, a counterbalance mass, a second spring connecting said counterbalance mass to said base to allow said counterbalance mass to oscillate relative to said base and a drive motor for causing said mirror and said counterbalance mass to oscillate, the improvement wherein at least a portion of said mirror frame and said base are comprised of a moldable material and are fabricated by a molding process and said first spring is inserted into said base and into said portion of said mirror frame during said molding process to form an integral mirror mount unit.

2. In a resonant electromechanical scanning unit, the improvement according to claim 1 wherein at least a portion of said counterbalance mass and said base are comprised of a moldable material and are fabricated by a molding process and said second spring is inserted into said base and into said portion of said counterbalance mass during said molding process to form an integral counterbalance mass unit.

3. In a resonant electromechanical scanning unit, the improvement according to claim 2 wherein said counterbalance mass comprises a first portion into which said second spring is inserted and a second portion which comprises most of the mass of said counterbalance mass.

4. In a resonant electromechanical scanning unit, the improvement according to claim 3 wherein said counterbalance mass second portion is comprised of a moldable material and is fabricated by a molding process.

5. In a resonant electromechanical scanning unit, the improvement according to claim 1, wherein said first spring has a plurality of holes therein so that, during said molding process, said moldable material comprising said base and said mirror frame enters said plurality of holes in said first spring to lock said first spring and said mirror frame together and to lock said first spring and said base together.

6. In a resonant electromechanical scanning unit, the improvement according to claim 2, wherein said second spring has a plurality of holes therein so that, during said molding process, said moldable material comprising said base and said counterbalance mass enters said plurality of holes in said second spring to lock said second spring and said counterbalance mass together and to lock said second spring and said base together.

7. In a resonant electromechanical scanning unit, the improvement according to claim 2, further comprising a movable tuning mass attached to said counterbalance mass, which movable tuning mass can be manually moved toward or away from said second spring to change the frequency at which said counterbalance mass oscillates relative to said base.

8. In a resonant electromechanical scanning unit, the improvement according to claim 7, wherein said movable tuning mass comprises a manually-bendable tuning wire.

9. In a resonant electromechanical scanning unit, the improvement according to claim 2, further comprising a movable tuning mass attached to said counterbalance mass, which movable tuning mass can be manually moved toward or away from said first spring to change the frequency at which said mirror and mirror frame oscillate relative to said base.

10. In a resonant electromechanical scanning unit, the improvement according to claim 9, wherein said movable tuning mass comprises a manually-bendable tuning wire.

11. A resonant electromechanical scanning unit comprising:
a base having a first subunit comprised of a moldable material and being fabricated by a first molding process and a second subunit comprised of a moldable material and being fabricated by a second molding process;

a mirror;

a mirror frame attached to said mirror having at least a portion thereof comprised of a moldable material and being fabricated by said first molding process;

a first spring being inserted into said first base subunit and into said portion of said mirror frame during said first molding process to form an integral mirror mount unit in which said mirror frame can oscillate relative to said first base subunit;

a counterbalance mass having at least a portion thereof comprised of a moldable material and being fabricated by said second molding process;

a second spring inserted into said second base subunit and into said portion of said counterbalance mass during said second molding process to form an integral counterbalance mass unit wherein said counterbalance mass can oscillate relative to said second base subunit;

a drive motor for causing said mirror mount unit and said counterbalance mass unit to oscillate.

12. A resonant electromechanical scanning unit according to claim 11, wherein said first base subunit is attached to said second base subunit to complete said scanning unit.

13. A resonant electromechanical scanning unit according to claim 12, wherein said counterbalance mass comprises a first portion into which said second spring is inserted and a second portion which comprises most of the mass of said counterbalance mass.

14. A resonant electromechanical scanning unit according to claim 13, wherein said counterbalance mass second portion is comprised of a moldable metal and is fabricated by a third molding process.

15. A resonant electromechanical scanning unit according to claim 14, wherein said first spring has a plurality of holes therein so that, during said first molding process, said moldable material comprising said first base subunit and said mirror frame enters said plurality of holes in said first spring to lock said first spring and said mirror frame together and to lock said first spring and said first base subunit together.

16. A resonant electromechanical scanning unit according to claim 15, wherein said second spring has a plurality of holes therein so that, during said second molding process, said moldable material comprising said second base subunit and said counterbalance mass enters said plurality of holes in said second spring to lock said second spring and said counterbalance mass together and to lock said second spring and said second base subunit together.

17. A resonant electromechanical scanning unit according to claim 16, further comprising a movable tuning mass attached to said counterbalance mass, which movable tuning mass can be manually moved toward or away from said second spring to change the frequency at which said counterbalance mass oscillates relative to said second base subunit.

18. A resonant electromechanical scanning unit according to claim 17, wherein said movable tuning mass comprises a manually-bendable tuning wire.

19. A resonant electromechanical scanning unit according to claim 16, further comprising a movable tuning mass attached to said counterbalance mass, which movable tuning mass can be manually moved toward or away from said first spring to change the frequency at which said mirror and mirror frame oscillate relative to said first base subunit.

20. A resonant electromechanical scanning unit according to claim 19, wherein said movable tuning mass comprises a manually-bendable tuning wire.

21. In a resonant electromechanical scanning unit having a base, a mirror, a mirror frame attached to said mirror, a first spring connecting said mirror frame to said base to allow said mirror and said mirror frame to oscillate relative to said base, a counterbalance mass, a second spring connecting said counterbalance mass to said base to allow said counterbalance mass to oscillate relative to said base and a drive motor for causing said mirror and said counterbalance mass to oscillate, the improvement comprising a movable tuning mass attached to said counterbalance mass, which movable tuning mass can be manually moved toward or away from said second spring to change the frequency at which said counterbalance mass oscillates relative to said base.

22. In a resonant electromechanical scanning unit, the improvement according to claim 21, wherein said movable tuning mass comprises a manually-bendable tuning wire.

23. In a resonant electromechanical scanning unit having a base, a mirror, a mirror frame attached to said mirror, a first spring connecting said mirror frame to said base to allow said mirror and said mirror frame to oscillate relative to said base, a counterbalance mass, a second spring connecting said counterbalance mass to said base to allow said counterbalance mass to oscillate relative to said base and a drive motor for causing said mirror and said counterbalance mass to oscillate, the improvement comprising a movable tuning mass attached to said counterbalance mass, which movable tuning mass can be manually moved toward or away from said first spring to change the frequency at which said mirror and said mirror frame oscillate relative to said base.

24. In a resonant electromechanical scanning unit, the improvement according to claim 23, wherein said movable tuning mass comprises a manually-bendable tuning wire.

* * * * *